April 29, 1930.   P. R. HOOPES   1,756,826
TRIMMING MACHINE
Filed Aug. 2, 1923   2 Sheets-Sheet 1
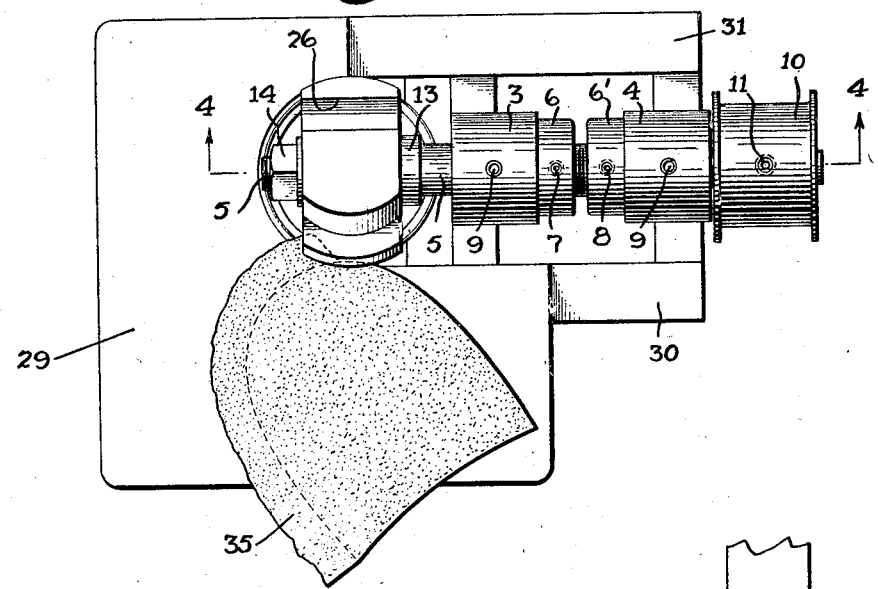
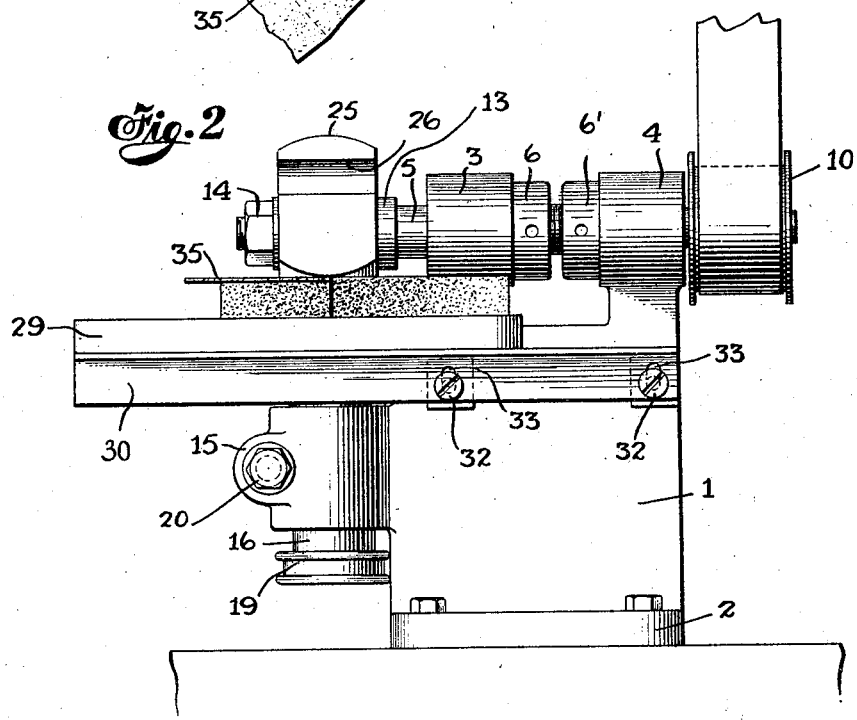
Inventor
Penrose R. Hoopes
By his Attorneys
Emery, Booth, Janney & Varney.

April 29, 1930. P. R. HOOPES 1,756,826
TRIMMING MACHINE
Filed Aug. 2, 1923 2 Sheets-Sheet 2
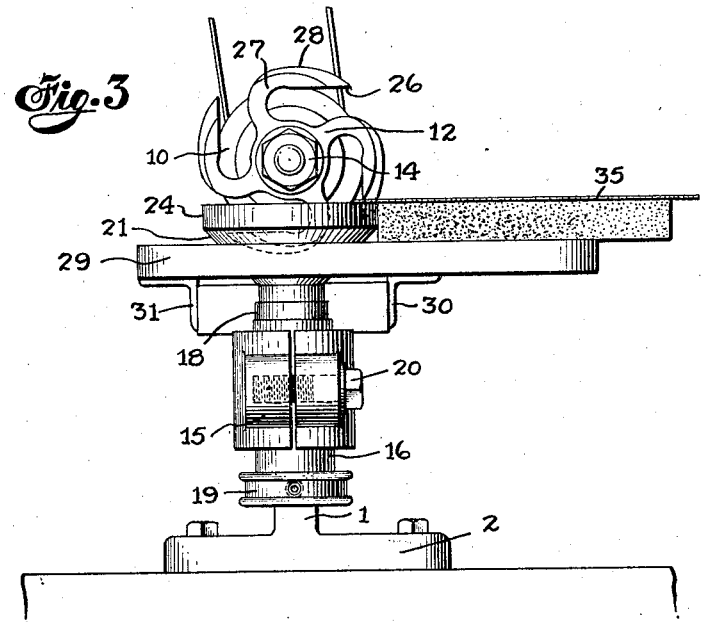
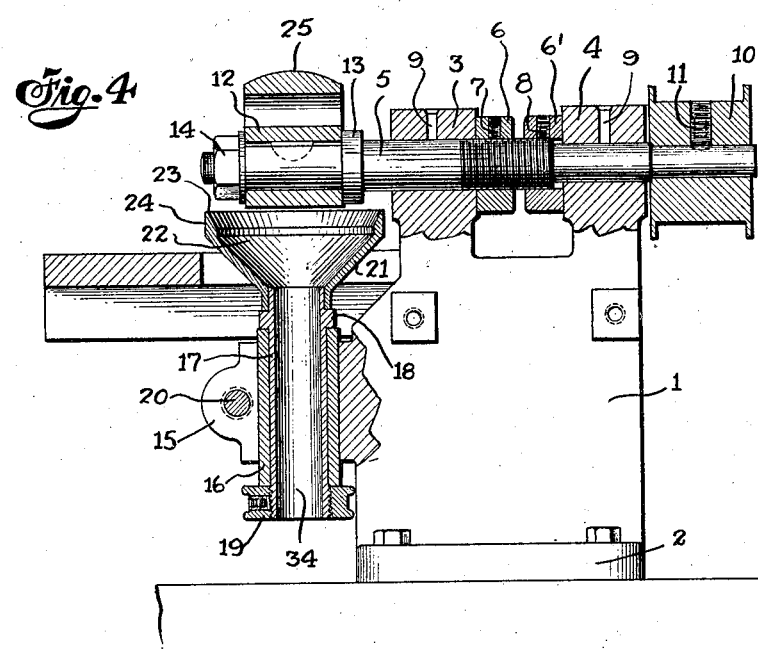

Patented Apr. 29, 1930

1,756,826

UNITED STATES PATENT OFFICE

PENROSE R. HOOPES, OF HARTFORD, CONNECTICUT, ASSIGNOR TO ESSEX RUBBER COMPANY, OF TRENTON, NEW JERSEY, A CORPORATION OF NEW JERSEY

TRIMMING MACHINE

Application filed August 2, 1923. Serial No. 655,183.

This invention relates to cutting machines, and pertains more particularly to a device for trimming edges or other excrescences from objects having an irregular contour.

It is an object of this invention to provide a cutting mechanism for this purpose which will be simple in construction and effective in operation, and which will minimize the difficulty often experienced in trimming machines of effectively trimming the undesired portions without occasionally damaging the object being trimmed.

A preferred embodiment of the invention selected for purposes of illustration is shown in the accompanying drawings, in which, Figure 1 is a plan view of the device,
Figure 2 is a side elevation,
Figure 3 is a front elevation,
Figure 4 is a section on the line 4—4 of Figure 1.

Referring to the drawings, the mechanism may be supported upon a frame 1 having a base 2 which may be bolted or otherwise secured to a suitable support. In the upper end of the frame 1 are formed a pair of bosses 3 and 4 in which is journaled a shaft 5. The shaft 5 may be screw-threaded along a portion of its length between the bosses 3 and 4, and a pair of collars 6 and 6' threaded thereon to secure proper longitudinal adjustment of the shaft 5. Set screws 7 and 8 may be provided to fix the collars 6 and 6' to the shaft when satisfactorily adjusted to hold the shaft in adjusted position. An oil hole 9 is provided in each of the bosses to properly lubricate the shaft.

A pulley 10 is fixed on one end of the shaft 5 by suitable set screw 11, said pulley serving to drive the shaft 5 from a suitable source of power.

On the opposite end of the shaft 5 is keyed a cutter 12 which may abut a coller 13 conveniently formed integrally with the shaft, the cutter being securely fixed to the shaft by a nut 14.

The frame 1 is also provided with an additional boss 15 which supports therein a sleeve 16 in which is journaled a shaft 17. The shaft 17 is provided with a ridge 18 to engage the upper end of the sleeve 16, and at its lower end may be provided with a collar 19. The collar 19 may be screw-threaded to engage a corresponding thread on the shaft 17 and relative rotation of the two will adjust the degree of freedom of longitudinal movement of the shaft 17. The boss 15 may be conveniently split and provided with a clamping screw 20 to provide means for clamping the sleeve 16 after proper longitudinal adjustment of the sleeve 16 and the shaft 17 with respect to the frame has been made.

In the upper end of the shaft 17 may be fixed an outwardly flaring cup 21 the inside of which is hollow, forming a recess 22. The extreme upper edge of the cup forms an annular flange which may be sharpened to form a cutting edge 23. The outer periphery of the cup may form a bearing surface 24, the purpose of which will be hereafter explained.

In the preferred embodiment of the invention illustrated the outside surface of the cutter 12 may be spherical as at 25, and the two shafts may be so adjusted as to cause the cutter to revolve within the cup 21. The cutter may be provided with sharpened edges 26 which edges will cooperate with the cutting edge 23 of the cup 21. Each of the blades 27 of the cutter may be cut down behind the cutting edge 26 as shown at 28 in order to prevent these blades dragging on the material being cut as would be the case if the blades were retained in spherical form throughout their full length. This relief, however, does not affect the actual cutting edge 26, all points of which lie on the surface of a sphere.

In cutting, the shaft 5 may be rotated at a moderately high rate of speed by the pulley 10, the shafts 5 and 17 having been previously adjusted in their bosses in such manner that the cutting blades 26 will cooperate with the cutting edge 23.

If desired, a supporting platform 29 may be provided on which the material to be cut or trimmed may be supported while the cutting operation is taking place. This platform may be supported on a pair of L-shaped bars 30 and 31 which are supported on the frame 1 by screws 32 passing through slots 33 in the bars.

In the embodiment illustrated a rubber heel 35 has been selected as a suitable object on which the cutter may operate. In the process of making rubber heels, a flange-like excrescence usually protrudes from the heel as it comes from the mould which it may be desirable to remove. The heel may be supported on the platform and pressed against the surface 24, the platform having been previously adjusted to such height that the distance between the cutting edge 23 and the platform will be substantially the thickness of the heel. As the heel is rotated the blades 26 cooperating with the cutting edge 23 will trim the edge from the heel, the friction of the heel serving to rotate the cup and cutting edge, the cup cooperating with the edge of the heel to form a point of contact coincident with the point of cutting. It will be apparent that the effective cutting edge will be determined by the width of the cutter 12 since the blades 26 cooperate throughout their entire width with the cutting edge 23.

When the periphery of an object is pressed against the guiding edge 24 of the cup 21, the surplus material to be removed will overhang the cutting edge 23 of the cup and will be sheared off by the rotating cutter 12. The shape of the cut will be arcuate, it will be convex toward the periphery of the article being trimmed, and will be tangent to the periphery of the article at the point where said article contacts with the guiding edge 24 of the cup. As the article is rotated in trimming, the point of contact of its periphery with the guiding edge of the cup may move from side to side across the guiding edge of the cup, and the point of tangency of the cut with the periphery of the article will likewise move in a corresponding manner, the movement depending upon the contour of the article being trimmed and upon the manner in which the article is rotated. Cutting will take place at any point within the limits of the arc of contact of the cutter 12 with the edge 23 of the cup 21, and provided that contact of the article with the guiding edge 24 is maintained within these limits of shearing cooperation between the cup 21 and the cutter 12, the surplus material will be accurately removed.

If desired, the collar 19 may be flanged at either side to provide a driving pulley which may be used to rotate the shaft 17 by means of a belt from any suitable source of power. It is to be understood, however, that in many cases it is preferable to leave the cup free to rotate through frictional contact with the object being trimmed. By thus depending upon frictional contact of the article to rotate the cup, the handling of the article is facilitated and a fresh cutting edge is continually presented to the work.

In order to provide an outlet for the cuttings, the shaft 17 may have a passage 34 formed therein through which the cuttings, after being dropped into the recess 22 of the cup 21, may pass.

It is to be understood that the invention is not limited to use with the particular article described herein, but that it is capable of application in trimming edges from other objects as well. It is to be understood also that the invention is not limited to the illustrative embodiment herein shown for purposes of illustration but that on the contrary it may be variously modified and embodied within the scope of the subjoined claims.

I claim as my invention:

1. A cutting mechanism comprising an annular cutting flange and a rotary cutter mounted in shearing relation thereto, said cutter having a shearing edge, all points of which lie in the surface of a sphere whose center lies in the axis of rotation of said cutter.

2. A cutting mechanism comprising a rotatably mounted curved cutting edge, a rotating cutter mounted in shearing relation thereto having a surface which conforms to the curvature of said cutting edge, the axes of rotation of said cutting edge and said cutter being intersecting.

3. A cutting mechanism comprising a cup, a curved cutting flange thereon, and a rotating cutter mounted in shearing relation thereto, said cutter having a shearing edge, all points of which lie in the surface of a sphere whose center lies in the axis of rotation of said cutter.

4. A cutting mechanism comprising a circular cutting edge and a rotary cutter mounted in shearing relation thereto, said cutter having a shearing edge, all points of which lie in the surface of a sphere whose center lies in the axis of rotation of said cutter.

5. A cutting mechanism comprising an annular rotatable cutting flange and a cutter having a shearing edge, all points of which lie in the surface of a sphere mounted in shearing relation thereto.

6. A cutting mechanism comprising a rotatable cup, an annular cutting flange thereon, and a cutter having a shearing edge, all points of which lie in the surface of a sphere mounted in shearing relation thereto.

7. A cutting mechanism comprising an annular cutting flange mounted for rotation, and a rotating cutter having a shearing edge, all points of which lie in the surface of a sphere mounted in shearing relation thereto.

8. A cutting mechanism comprising a rotating cup, an annular cutting flange thereon, and a rotating cutter having a shearing edge, all points of which lie in the surface of a sphere mounted in shearing relation thereto.

9. A cutting mechanism comprising an annular cutting flange, and a rotating cutter mounted in shearing relation thereto, said cutter having a shearing edge, all points of which lie in the surface of a sphere whose center lies in the axis of rotation of said cutter, said flange being provided with a bearing surface with which an article to be trimmed may contact.

10. A cutting mechanism comprising an annular rotating cutting flange and a cutter having a shearing edge, all points of which lie in the surface of a sphere mounted in shearing relation thereto, said flange being provided with a bearing surface with which an article to be trimmed may contact.

11. A cutting mechanism comprising an annular cutting flange mounted for rotation, and a rotating cutter having a shearing edge, all points of which lie in the surface of a sphere mounted in shearing relation thereto, said flange being provided with a bearing surface with which an article to be trimmed may contact.

12. A cutting mechanism comprising, a rotatably mounted cutter having a shearing edge, all points of which lie in the surface of a sphere, a rotatably mounted annular cutting flange, the plane of said flange intersecting the surface of said cutter.

13. A cutting mechanism comprising a frame, a shaft journaled therein, a rotary cutter carried thereon, said cutter having a shearing edge, all points of which lie in the surface of a sphere whose center lies in the axis of rotation of said cutter, an annular cutting flange also mounted on said frame, the plane of said flange intersecting the surface of said cutter.

14. A cutting mechanism comprising a shaft, a cutter having a shearing edge, all points of which lie in the surface of a sphere carried thereon, a second shaft, an annular cutting flange mounted thereon, the axes of said shafts intersecting at the center of said cutter.

15. A cutting mechanism comprising a frame, a shaft journaled therein, a rotary cutter carried thereon, said cutter having a shearing edge, all points of which lie in the surface of a sphere whose center lies in the axis of rotation of said cutter, an annular cutting flange also mounted on said frame, the plane of said flange intersecting the surface of said cutter, and means for adjusting and securing said cutters in adjusted position.

16. A cutting mechanism comprising a frame, a shaft journaled therein, a cutter having a shearing edge, all points of which lie in the surface of a sphere carried thereon, a second shaft journaled on said frame, an annular cutting flange mounted thereon, the axes of said shafts intersecting at the center of said cutter, said second shaft being provided with a passage through which cuttings may pass.

17. A cutting mechanism comprising a rotatable cylindrical cutting blade in combination with an independently rotatable cutting blade, having an edge, all points of which lie in the surface of a sphere.

18. A cutting mechanism comprising a power driven rotatable cutter having a shearing edge, all points of which lie in the surface of a sphere and a frictionally driven rotatable cylindrical cutting blade.

19. A cutting mechanism comprising a power driven rotatable cutter in combination with a frictionally driven rotatable cutting blade, said cutting blade being provided with a surface against which an article to be cut may bear to rotate the blade and to establish a cutting point at the point of contact.

20. A cutting mechanism comprising a power driven rotatable cutter having a shearing edge, all points of which lie in the surface of a sphere and a frictionally driven rotatable cylindrical cutting blade, said cutting blade being provided with a surface against which an article to be cut may bear to rotate the blade and to establish a cutting point at the point of contact.

21. A cutting mechanism comprising an annular cutting flange and a rotary cutter tooth mounted in shearing relation thereto, said cutter tooth having its cutting edge lying in the surface of a sphere whose center lies in the axis of rotation of said cutter, said flange being provided with a bearing surface with which an article to be trimmed may contact.

22. A cutting mechanism comprising an annular cutting edge, a rotary cutter mounted in shearing relation thereto, said cutter having a shearing edge, all points of which lie in the surface of a sphere whose center lies in the axis of rotation of said cutter, and means conforming to said cutting edge for guiding the article to be trimmed.

In testimony whereof, I have signed my name to this specification this 27th day of July, 1923.

PENROSE R. HOOPES.